United States Patent [19]
Leis

[11] Patent Number: 5,942,105
[45] Date of Patent: Aug. 24, 1999

[54] FLOAT ACTUATED WATER CONTROL VALVE

[75] Inventor: Kenneth K. Leis, Waukesha, Wis.

[73] Assignee: All-Glass Aquarium Company, Inc., Franklin, Wis.

[21] Appl. No.: 08/851,606

[22] Filed: May 5, 1997

[51] Int. Cl.[6] ............................ B01D 29/90; A01K 63/04
[52] U.S. Cl. .................... 210/129; 210/169; 210/335; 210/430; 119/248; 119/259; 137/399; 137/433
[58] Field of Search ..................... 210/129, 169, 210/128, 335, 416.2, 430, 429; 119/248, 259; 137/398, 399, 433, 549

[56] References Cited

U.S. PATENT DOCUMENTS

| | | | |
|---|---|---|---|
| 351,200 | 10/1886 | Montgomery | 137/433 |
| 654,033 | 7/1900 | Stewart | 210/129 |
| 1,442,171 | 1/1923 | Murphy . | |
| 2,665,250 | 1/1954 | Willinger et al. | 210/16 |
| 2,829,666 | 4/1958 | Landers et al. | 137/398 |
| 2,940,467 | 6/1960 | Smith | 137/433 |
| 3,067,879 | 12/1962 | Baker | 210/129 |
| 3,529,574 | 9/1970 | Kelley et al. | 119/5 |
| 3,555,574 | 1/1971 | Stanwood | 210/169 |
| 3,633,610 | 1/1972 | Hellqvist | 137/433 |
| 3,785,493 | 1/1974 | Harding | 210/169 |
| 4,267,042 | 5/1981 | Hofmann | 210/169 |
| 4,457,377 | 7/1984 | Burris, II | 166/332 |
| 4,606,821 | 8/1986 | D'Imperio | 210/169 |
| 4,684,462 | 8/1987 | Augustyniak | 210/97 |
| 4,842,727 | 6/1989 | Willinger et al. | 210/169 |
| 5,006,230 | 4/1991 | Votava, III et al. | 210/94 |
| 5,086,524 | 2/1992 | Stevens | 4/415 |
| 5,176,824 | 1/1993 | Willinger et al. | 210/151 |
| 5,242,582 | 9/1993 | Marioni | 210/151 |
| 5,292,431 | 3/1994 | Romagnoli | 210/127 |
| 5,306,421 | 4/1994 | Weinstein | 210/151 |
| 5,413,707 | 5/1995 | Shatilov | 119/259 |
| 5,453,182 | 9/1995 | Kikuta | 210/169 |
| 5,518,611 | 5/1996 | Bresolin | 210/169 |
| 5,567,315 | 10/1996 | Weidenmann et al. | 210/123 |
| 5,626,747 | 5/1997 | Ritzow et al. | 210/169 |

*Primary Examiner*—Christopher Upton
*Attorney, Agent, or Firm*—Andrus, Sceales, Starke & Sawall

[57] ABSTRACT

A float actuated water level control valve has a sliding valve tube depending from a float to meter the amount of water flow through the valve proportionally in response to the position of the float. The valve is especially useful for controlling the water level in an aquarium overflow filter system. The valve inlet has an adjustable flow area which is defined as the area between a lower edge of the sliding valve tube and an upper edge of a drain. The configuration of the lower edge of the sliding valve tube and the upper edge of the drain are selected to provide increased flow area linear to the position of the float. The valve inlet is submerged, and drain gurgling sounds are thereby muffled. In addition, the valve maintains the water level within the reservoir at a height above the valve inlet, which is especially useful for reducing splashing sounds from water spilling over an overflow wall in an aquarium.

16 Claims, 2 Drawing Sheets

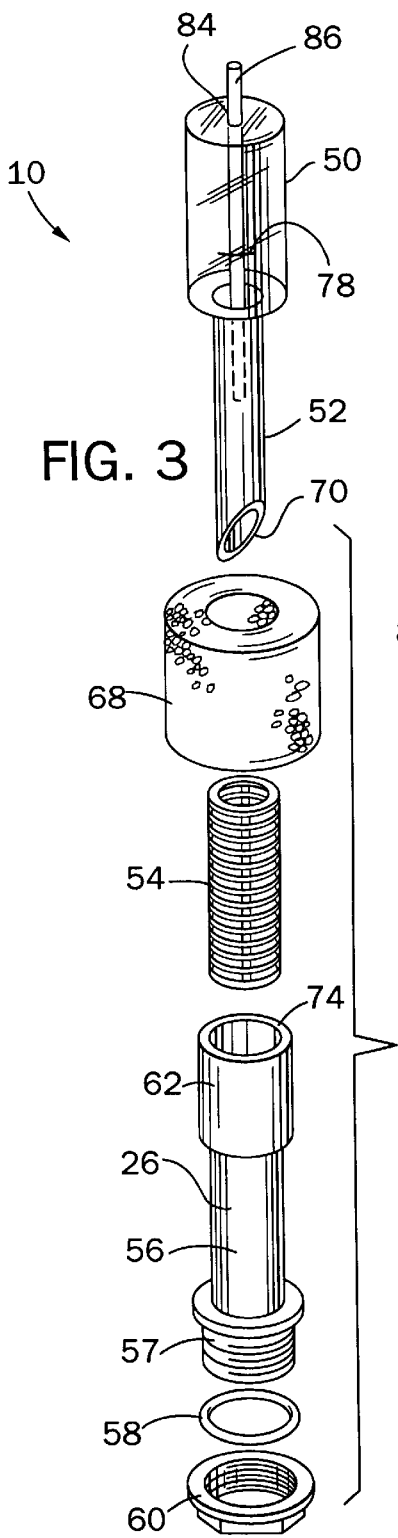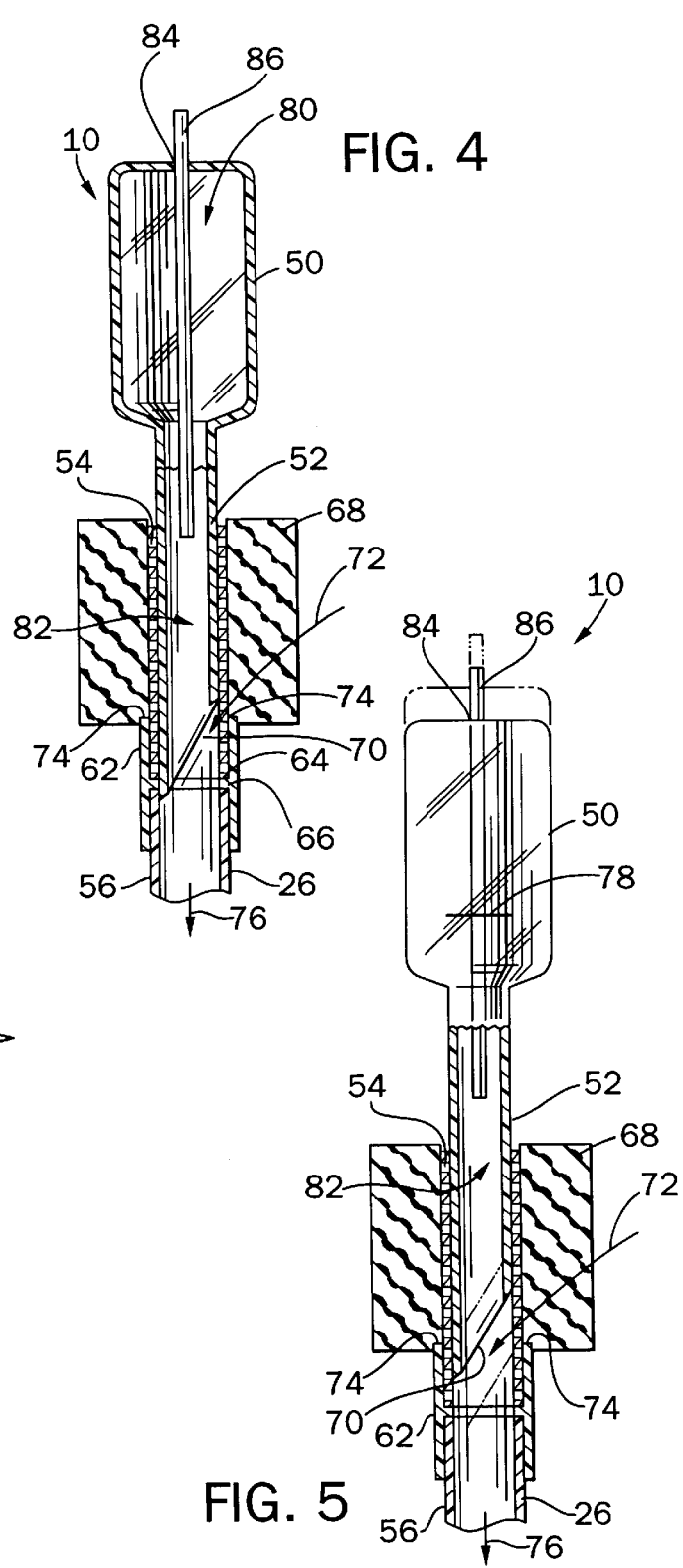

FLOAT ACTUATED WATER CONTROL VALVE

FIELD OF THE INVENTION

The invention relates to a float actuated water level control valve. The invention is particularly effective for reducing noise associated with aquarium overflow filter systems.

BACKGROUND OF THE INVENTION

Overflow filter systems are typically used in salt water aquariums, but can also be used in freshwater aquariums. One of the main reasons overflow walls are used is to avoid flooding in the event the wet/dry filter and/or pump system fails (e.g., because of loss of power to the pump, etc.). Overflow filter systems have an overflow wall or barrier that extends continuously upward from the floor of an aquarium tank surrounding a filter intake region. Water in the main region of the aquarium tank flows over the top of the overflow wall into the filter intake region. Plumbing for a remote wet/dry filter system and a return pump is usually installed through the floor of the aquarium in the filter intake region. In a conventional system, water in the filter intake region flows by gravity downward out of the aquarium tank through a drain to a remote wet/dry filter.

Often a standpipe is included as part of the drain to raise the water level in the filter intake region of the aquarium. A foam pre-filter is sometimes mounted on the standpipe. After being filtered by the wet/dry filter, water is returned to the aquarium by a return pump. Although the return tube is typically installed through the floor of the aquarium in the filter intake region, the outlet spout for the return tube returns the filtered water to the main region of the aquarium tank outside of the filter intake region.

In a typical overflow filter system, water thus circulates throughout the aquarium system as follows: 1) water from the main region of the aquarium tank flows over the overflow wall into the filter intake region; 2) water in the filter intake region flows through the pre-filter and falls by gravity through the drain to the remote wet/dry filter; and 3) filtered water from the wet/dry filter is pumped through a return line to the main region of the aquarium tank outside of the filter intake region.

In conventional overflow filter systems, splashing noises are created as water spills over the top of the overflow wall from the main aquarium region into the filter intake region. Gurgling sounds are also created as water flows through plumbing associated with wet/dry filter systems. The gurgling sounds are generated because a significant amount of air becomes entrained with water flowing through the aquarium drain, and the entrained air can often produce gurgling sounds. Some people find the splashing and gurgling sounds to be annoying.

SUMMARY OF THE INVENTION

The invention is a float actuated water level control valve that is particularly effective for reducing noise associated with aquarium overflow filter systems. The valve controls the water level at a height above the valve inlet so that the valve inlet is submerged. Submerging the valve inlet muffles gurgling sounds created through plumbing associated with wet/dry filter systems. In addition, the water level in the filter intake region of the aquarium is raised, thereby reducing splashing noises by overflow water spilling into the filter intake region.

The float actuated water level control valve includes a float and a sliding valve tube extending downward from the float. A vertically extending valve guide is mounted on the aquarium drain. The sliding valve tube is placed in the valve guide, and moves up and down in response to buoyancy forces acting on the float. Absent the sliding valve tube, water would flow unrestricted through the drain. However, when the valve is in a closed position (i.e. buoyancy forces on the float insufficient to raise the float and sliding valve tube), flow through the valve inlet is restricted, thereby causing the water level in the filter intake region of the aquarium to rise gradually. As the water level rises to the water buoyancy line of the float, buoyancy forces move the float vertically upward and the sliding valve tube slides upward to open the valve proportionally. The water level within the filter intake region of the aquarium is therefore maintained at a relatively constant height when the aquarium overflow filter system operates in steady state.

The valve inlet is defined by an opening between a lower edge of the sliding valve tube and an upper edge of an inlet portion for the drain. It is preferred that the configuration of the lower edge of the sliding valve tube and the upper edge of the drain be selected to provide metering of the water flow that is linearly proportional to the position of the float. The preferred manner of achieving this is to configure the lower edge of the sliding valve tube so that the lower edge lies in a plane that is not perpendicular to the vertical axis of the sliding valve tube, and preferably so that the lower edge intersects the vertical axis of the sliding valve tube at an angle of approximately 20° to 30°. The upper edge of the drain is configured preferably to lie in a plane perpendicular to the vertical axis of the sliding valve tube.

In order to facilitate reliable positioning of the lower edge of the valve slide tube with respect to the water level within the filter intake region, the volume inside the sliding valve tube is coextensive with the volume inside the float. In addition, the float contains a vacuum relief hole through a portion of the float located above the water buoyancy line of the float. This design reduces valve instability due to pressure vacuums. An elongated muffling tube is preferably inserted through the vacuum relief hole to muffle sound that could otherwise propagate through the sliding valve tube and the float through the vacuum relief hole to the environment.

Other features and objects of the invention may be apparent to those skilled in the art upon inspecting the following drawings and description thereof.

BRIEF DESCRIPTION OF THE SEVERAL VIEWS OF THE DRAWINGS

FIG. 3 is an exploded view of a float actuated water level control valve in accordance with the invention;

FIG. 4 is a longitudinal sectional view of the float actuated water level control valve showing the valve in a closed position; and FIG. 5 is a longitudinal sectional view similar to FIG. 4 showing the valve in an open position.

DETAILED DESCRIPTION OF THE INVENTION

Figure 1:
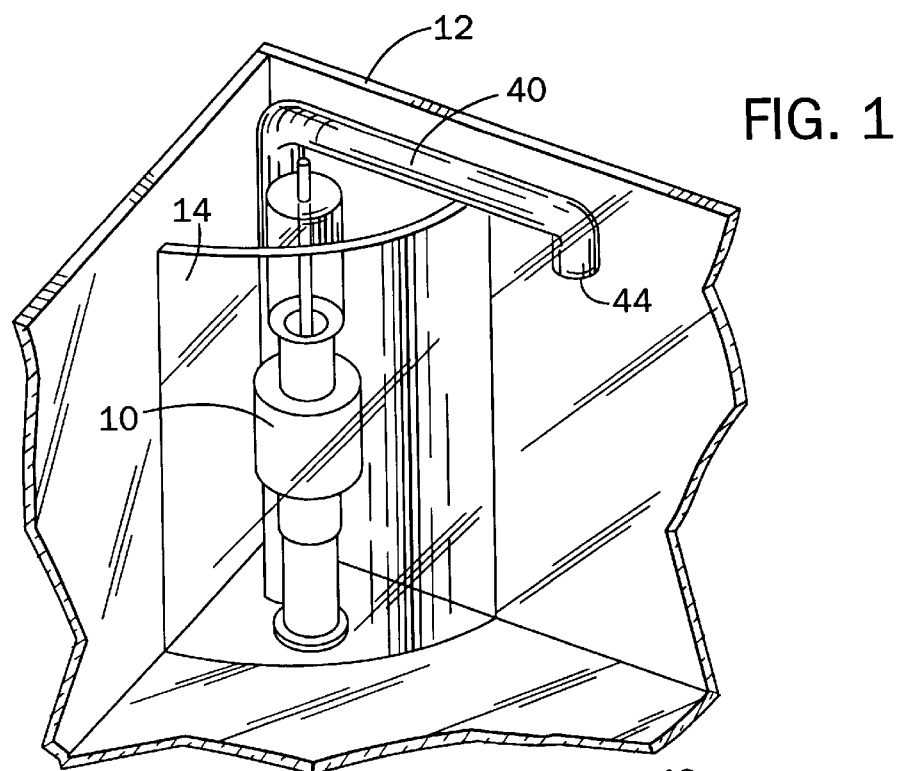
FIG. 1 is a perspective view of an aquarium overflow filter system having a float actuated water level control valve in accordance with the invention.
Figure 2:
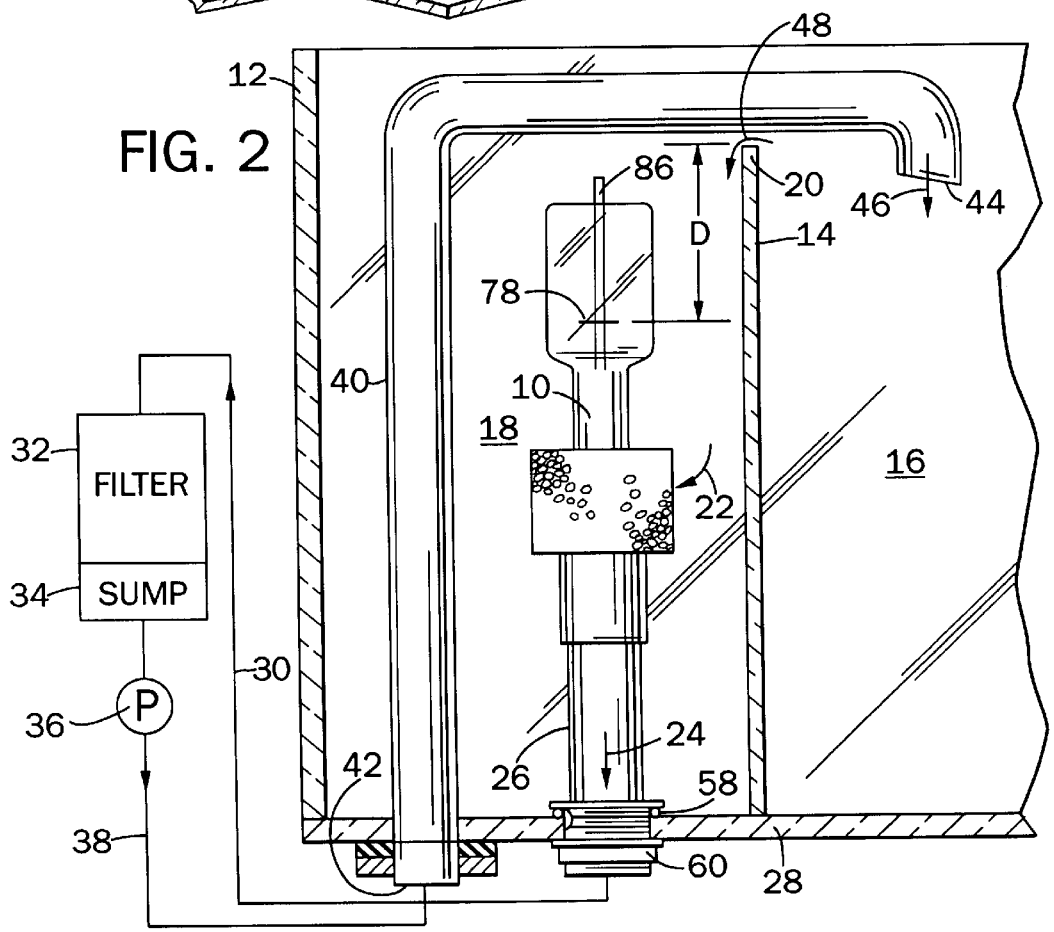
FIG. 2 is a side elevational schematic view of an aquarium overflow filter system having a float actuated water level control valve in accordance with the invention.

Referring to FIGS. 1 and 2, a float actuated water level control valve 10 in accordance with the invention is wellsuited for use in an aquarium tank 12 having an overflow wall 14. The overflow wall 14 separates the aquarium tank 12 into a main aquarium region 16 and a filter intake region 18. Water in the filter intake region 18 flows into the valve 10, arrow 22, and by gravity flows downward through a drain 26, arrow 24. The drain 26 is mounted through the bottom 28 of the aquarium tank 12 in the filter intake region 18. From the aquarium drain 26, water flows through line 30 to a wet/dry filter 32 which includes a sump 34. A return pump 36 pumps filtered water from the sump 34 through a return line 38 to the aquarium 12. A return tube 40 is mounted through the bottom 28 of the aquarium 12 in a filter intake region 18 of the aquarium tank 12. The return tube 40 is generally L-shaped. The return tube 40 has an inlet 42 that receives filtered water pumped through return line 38, and has an outlet 44 that is positioned to discharge water into the main aquarium region 16 of the aquarium tank 12, as depicted by arrow 46. Water in the main aquarium region 16 spills over a top edge 20 of the overflow wall 14 into the filter intake region 18 as depicted by arrow 48. For purposes of illustration, the water level within the filter intake region 18 is shown as a distance "D" below the top edge 20 of the overflow wall 14. One purpose of the float actuated water level control valve 10 is to maintain water level within the filter intake region 18 at a relatively constant level when the overflow filter system is operating in steady state (the distance "D is the distance between the top edge 20 of the overflow wall 14 and the relatively constant water level in the filter intake region 18).

Referring now to FIG. 3, the preferred float actuated water level control valve 10 includes a float 50 and a sliding valve tube 52 depending vertically downward from the float 50. The float 50 and the sliding valve tube 52 are preferably integral components made of polyurethane molded via a plastic blow molding process. The valve 10 includes a vertical valve guide 54 that is mounted on the drain 26. In the preferred embodiment of the invention, the drain 26 comprises a vertical standpipe 56 having a threaded bottom fitting 57 that is mounted through the bottom 28 of the aquarium tank 12 using an O-ring 58 and a sealing nut 60. The standpipe 56 has an upper inlet portion 62 that is cylindrically-shaped with a vertical cylinder axis. The upper inlet portion 62 of the standpipe 56 is sized and configured to securely support the vertical valve guide 54, although the vertical valve guide may be removable from the standpipe 56. The upper inlet portion 62 is preferably integral or attached to the standpipe 56.

Referring briefly to FIGS. 4 and 5, these figures show the upper inlet portion 62 being attached to the standpipe 56. A support ridge 64 extends inward from the inside wall of the upper inlet portion 62, and the upper inlet portion 62 preferably fits tightly over the standpipe 56 so that a top edge 66 of the standpipe 56 abuts the support ridge 64. The valve guide 54 preferably has the same outer diameter as the outer diameter of the main portion of the standpipe 56. The valve guide 54 therefore fits snugly within the upper inlet portion 62 above the support ridge 64. The snug fit maintains the valve guide 54 in a vertical orientation.

Referring again to FIG. 3, the preferred valve guide 54 is a conventional filter core having at least one, and preferably, several openings to allow water to flow therethrough. The inside diameter of the filter core 54 is slightly larger than the outer diameter of the sliding valve tube 52, so that the sliding valve tube 52 can slide up and down within the filter core 54. It is preferred that an open-cell foam pre-filter 68 be installed over the filter core 54.

The valve 10 is assembled by mounting the drain 26 through the aquarium bottom 28 so that the standpipe 56 extends vertically upward, placing the valve guide 54 (i.e. the filter core 54) within the upper inlet portion 62 on the drain 26, placing the foam pre-filter 68 around the valve guide 54, and installing the integral float and sliding valve tube 52 so that the sliding valve tube 52 slides vertically within the valve guide 54.

The sliding valve tube 52 extends downward from the float 50 along a vertical axis. The sliding valve tube 52 preferably has a circular cross section. Referring in particular to FIGS. 4 and 5, water flows into the valve 10, as depicted by arrow 72, in the space (i.e. valve inlet) provided between a lower edge 70 of the sliding valve tube 52 and an upper edge 74 of the upper inlet portion 62 of the drain 26. Water flow into the valve 10 is metered in proportion to the size of the valve inlet between the lower edge 70 of the slide tube 52 and the upper edge 74 of the drain 26. Preferably, the lower edge 70 of the slide tube 52 is cut so that water flow into the valve 10 is metered linearly with respect to physical location of the sliding valve tube 52 in relation to the drain 56. The lower edge 70 of the sliding valve tube 52 preferably lies in a plane that intersects the vertical axis of the sliding valve tube 52 at an angle of approximately 20–30°, and preferably approximately 25° in the embodiment shown in the drawings. The upper ledge 74 of the upper inlet portion 62 of the drain 26 preferably lies in a plane that is perpendicular to the vertical axis of the sliding valve tube 52.

Still referring to FIGS. 4 and 5, once water in the filter intake region 18 of the aquarium 12 reaches the height of the upper edge 74 of the drain 26, water flows into the valve 10 through the valve inlet between the lower edge 70 of the sliding valve tube 52 and the upper edge 74 of the drain 26. Within the valve 10, water falls due to the force of gravity through the drain 56 as depicted by arrow 76. A restricted amount of water flow is allowed through the valve 10 when the valve 10 is closed so that the water level surrounding the valve 10 (i.e., the water level in the filter intake region 18 of the aquarium tank 12) rises gradually above the level of the upper edge 74 of the drain 26, and gradually above the valve inlet between the lower edge 70 of the sliding valve tube 52 and the upper edge 74 of the upper inlet portion 62 of the drain 26. Because the upper edge 74 of the drain 26 and the valve inlet are submerged, gurgling sounds generated by the flow of water with entrained air through the aquarium drain 26 are muffled.

The water level in the filter intake region 18 continues to rise gradually with the valve 10 in the closed position until the water level in the filter intake region 18 rises to a buoyancy water line 78 on the float 50. As the water level in the filter intake region 18 continues to rise, the force of buoyancy pushes the float 50 vertically upward, thereby sliding the sliding valve tube 52 vertically upward within the valve guide 54. As the float 50 moves upward, the flow area of the valve inlet between the lower edge 70 of the sliding valve tube 52 and the upper edge 74 of the upper inlet portion 62 of the drain 26 increases, which allows a greater flow rate of water to flow through the drain 26. As mentioned above, the lower edge 70 of the slide tube 52 is configured so that more water is allowed to flow to the valve 10 as the float continues to raise the slide valve. The diameter of the drain 26 should be chosen to provide a flow rate in excess of the maximum return flow rate from pump 36 through return line 38 and return tube 40 which discharges into the main portion 16 of the aquarium 12. In this manner, the float actuated water level control valve 10 can open and close as necessary to maintain the water level within the filter intake region at a preferred water level corresponding to the buoyancy water line 78 on the float. In the embodiment of the invention shown in the drawings, assuming that the diameter of the slide valve tube 52 is approximately one inch, the vertical stroke of the slide tube is between 1½ inches and 2¼ inches. Therefore, the valve 10 operates to maintain the water level in the filter intake region 18 under steady state operating conditions within a range of 1 to 1½ inches of the preferred water level, i.e. distance "D" in FIG. 2. Note that the water level "D" within the filter intake region 18 is substantially higher than the height of the upper edge 74 of the inlet portion 62 on the drain standpipe 56. Thus, water spilling from the main region 16 of the aquarium over the top end 20 of the overflow wall 14 into filter intake region 18 has a shorter distance to fall before splashing when using the valve 10. The shorter distance "D" between the top end 20 of the overflow wall 14 and the water level within the filter intake region 18 reduces the loudness of splashing noises.

In the preferred embodiment of the invention, the diameter of the float 50 is substantially larger than the diameter of the sliding tube 52, which allows the float 50 to be more vertically compact. However, to carry out the invention, it is not necessary that the diameter of the float 50 be greater than the diameter of the sliding valve tube 52. The inner volume 80 of the float 50 is coextensive with the inner volume 82 of the sliding valve tube 52. Note that during steady state operation of the overflow filter system the lower edge 70 of the sliding valve tube 52 opens above a dynamic flow of water flowing into and through the drain 26, arrows 72 and 76. However, when the overflow filter system is idle, the water level in the filter intake region 18 may be above the level of the upper end 74 of the drain 26. Upon system startup, water standing within the sliding valve tube 56 drains contemporaneously with a restricted amount of water flowing through the valve inlet between the bottom edge 70 of the sliding valve tube 52 and the upper edge 74 of the drain 26. The float 50 contains a vacuum relief hole 84 at a location above the buoyancy water line 78. The primary purpose of the vacuum relief hole 84 is to allow standing water within the sliding valve tube 52 to drain upon system startup without creating vacuum or suction pressures within the coextensive volumes 80 within the float 50 and 82 within the sliding valve tube 52. Absent a vacuum relief hole 84, buoyancy forces on the float 50 must overcome suction created within the volumes 80 and 82, thereby rendering the valve 10 unstable. An elongated muffling tube 86 is inserted through the pressure vacuum relief hole 84 in the float 50. Without the elongated muffling tube 86, a direct acoustic path would from the drain 26 through the valve 10 and through the vacuum relief hole 84 in the float 50 to the surrounding environment. The purpose of the elongated muffling tube 86 is to attenuate sound passing through the vacuum relief hole 84 in the float 50, thereby maintaining one of the principal advantages of the valve 10 as used in an aquarium overflow filter system which is to reduce the propagation of gurgling noises to the surrounding environment.

Although the invention has been described as used in conjunction with an aquarium overflow system, those skilled in the art will recognize that a float actuated water level control valve 10 as disclosed herein, may be useful to control water levels within other types of reservoirs with drains.

In addition, is recognized that various equivalents, modifications, and equivalents of the invention may be possible in accordance with the true spirit of the invention. Such modifications, alternatives and equivalents should be considered to fall within the scope of the following claims.

I claim:

1. An aquarium having an overflow filter system comprising:

a tank including an overflow wall that separates the tank into a main aquarium region and a filter intake region so that water from the main aquarium region flows over the overflow wall into the filter intake region;

a drain located within the filter intake region of the tank;

a filter that receives water that is passed through the drain;

a filtered water return tube that returns filtered water from the filter to the main aquarium region; and a float actuated water control valve that controls the flow of water from the filter intake region of the tank through the drain of the tank, the water control valve having a float and a valve inlet that is submerged when the float is floating on water present within the filter intake region of the tank; and wherein the float actuated water control valve further includes:
   a sliding valve tube depending from the float; and
   a vertically extending valve guide mounted on the drain, the valve guide including at least one opening for allowing water to flow therethrough.

2. An aquarium as recited in claim 1 wherein the valve guide is a filter core and an open cell foam filter is mounted over the filter core.

3. An aquarium as recited in claim 1 wherein the drain comprises a standpipe having an upper inlet portion, and the valve guide is mounted on the standpipe to extend vertically upward from the upper inlet portion of the standpipe.

4. An aquarium as recited in claim 1 wherein the sliding valve tube has a circular cross section and extends along a vertical axis, and the sliding valve tube further includes a lower edge that lies in a plane which is not perpendicular to the vertical axis for the sliding valve tube.

5. An aquarium as recited in claim 4 wherein the plane in which the lower edge of the sliding valve tube lies intersects the vertical axis at an angle of approximately 20° to 30°.

6. An aquarium as recited in claim 1 wherein the sliding valve tube includes a lower edge that is formed to provide flow control between itself and an upper edge of the drain that is linear to the position of the lower edge of the sliding valve tube with respect to the position of the upper edge of the drain.

7. An aquarium as recited in claim 1 wherein the float includes an inner volume that is coextensive with an inner volume of the sliding valve tube and the float further includes a vacuum relief hole at a location on the float above a buoyancy water line of the float.

8. An aquarium as recited in claim 7 wherein an elongated muffling tube is inserted through the vacuum relief hole in the float to attenuate sound passing through the vacuum relief hole in the float.

9. A water control valve for a reservoir comprising:

a reservoir drain having a vertically extending inlet portion;

a valve guide extending vertically upward from the inlet portion of the reservoir drain, the valve guide having at least one opening to allow water to flow therethrough;

a float; and a sliding valve tube depending from the float, the sliding valve tube being guided by the valve guide to slidably engage the vertically extending inlet portion of the reservoir drain so that water flow through the reservoir drain is metered by a lower edge of the sliding valve tube as the float slides the tube up and down in response to the water level within the reservoir tank;

wherein the sliding valve tube has a circular cross section and extends along a vertical axis, and the lower edge of the sliding valve tube lies in a plane which is not perpendicular to the vertical axis of the sliding valve tube.

10. A water control valve as recited in claim 9 wherein the valve guide is a filter core and an open cell foam filter is mounted over the filter core.

11. A water control valve as recited in claim 9 wherein the vertically extending inlet portion of the reservoir drain includes a standpipe that extends upward from a bottom surface of the reservoir.

12. A water control valve as recited in claim 9 wherein the plane in which the lower edge of the sliding valve tube lies intersects the vertical axis of the sliding valve tube at an angle of approximately 20° to 30°.

13. A water control valve as recited in claim 9 wherein the sliding valve tube includes a lower edge that is formed to provide flow control between itself and the reservoir drain that is linear to the position of the lower edge of the tube with respect to the position of an upper edge of the reservoir drain.

14. A water control valve as recited in claim 8 wherein the float includes an inner volume that is coextensive with an inner volume of the sliding valve tube, and the float further includes a vacuum relief hole at a location on the float above a buoyancy water line for the float.

15. A water control valve as recited in claim 14 wherein an elongated muffling tube is inserted through the vacuum relief hole in the float to attenuate sound passing through the vacuum relief hole in the float.

16. A water control valve as recited in claim 14 wherein the float and the sliding valve tube are integrally formed using a plastic blow molding process.

* * * * *